(12) United States Patent
Fukasawa et al.

(10) Patent No.: US 6,377,989 B1
(45) Date of Patent: Apr. 23, 2002

(54) DISTRIBUTING SYSTEM, CLIENT, METHOD AND MEDIUM

(75) Inventors: Toshihiko Fukasawa, Machida; Kenji Morita, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,865

(22) Filed: Dec. 22, 1998

(30) Foreign Application Priority Data

Dec. 25, 1997 (JP) ............................................. 9-357302

(51) Int. Cl.[7] ............................................ G06F 15/173
(52) U.S. Cl. ........................ 709/224; 709/200; 709/201; 709/203; 709/233; 345/327
(58) Field of Search ................................ 709/224, 233, 709/201, 200, 203; 345/327

(56) References Cited

U.S. PATENT DOCUMENTS

| | | | |
|---|---|---|---|
| 5,636,211 A | * 6/1997 | Newlin et al. | 370/465 |
| 5,699,359 A | * 12/1997 | Suga | 370/395 |
| 5,941,951 A | * 8/1999 | Day et al. | 709/233 |
| 5,959,677 A | * 9/1999 | Date et al. | 348/423 |
| 6,072,809 A | * 6/2000 | Agrawal et al. | 370/503 |
| 6,160,544 A | * 12/2000 | Hayashi et al. | 345/327 |

OTHER PUBLICATIONS

IBMTDB, title: Interactive Computer Conference Server, vol. 34, issue 7A, pp. 375–377, Dec. 1991.*

* cited by examiner

*Primary Examiner*—Ayaz Sheikh
*Assistant Examiner*—Frantz B. Jean
(74) *Attorney, Agent, or Firm*—Morgan & Finnegan, LLP

(57) ABSTRACT

An object of this invention is to be able to cope with a sudden change in network delay time and dissolve waste of the network delay time in a remote video signal distributing system for performing a multimedia data distributing service in a remote place through a computer network. This invention discloses a system having a request means for obtaining multimedia data from a server program, predicted value obtaining means for obtaining a predicted value of a passing time (network delay time) from a request to data obtaining and a predicted value of a frame rate, unprocessed request number obtaining means for obtaining the number of requests unprocessed by the server program, and request transmitting control means for controlling transmission of the request on the basis of the predicted values of the network delay time and the frame rate and the unprocessed request number.

42 Claims, 12 Drawing Sheets

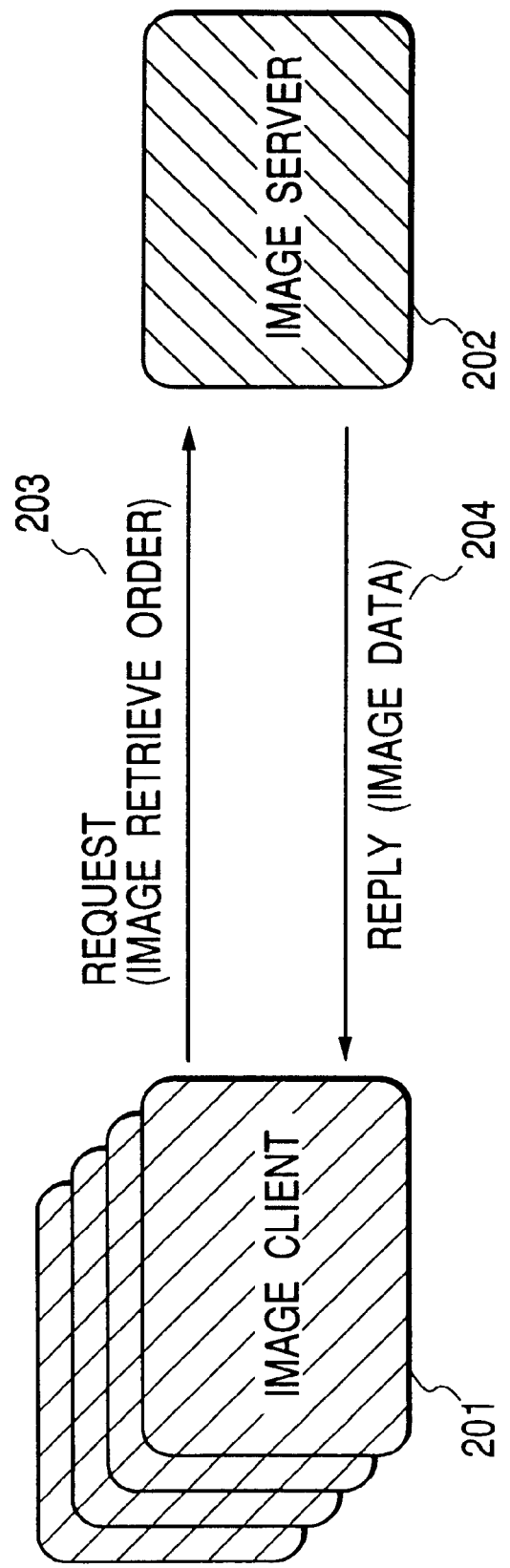

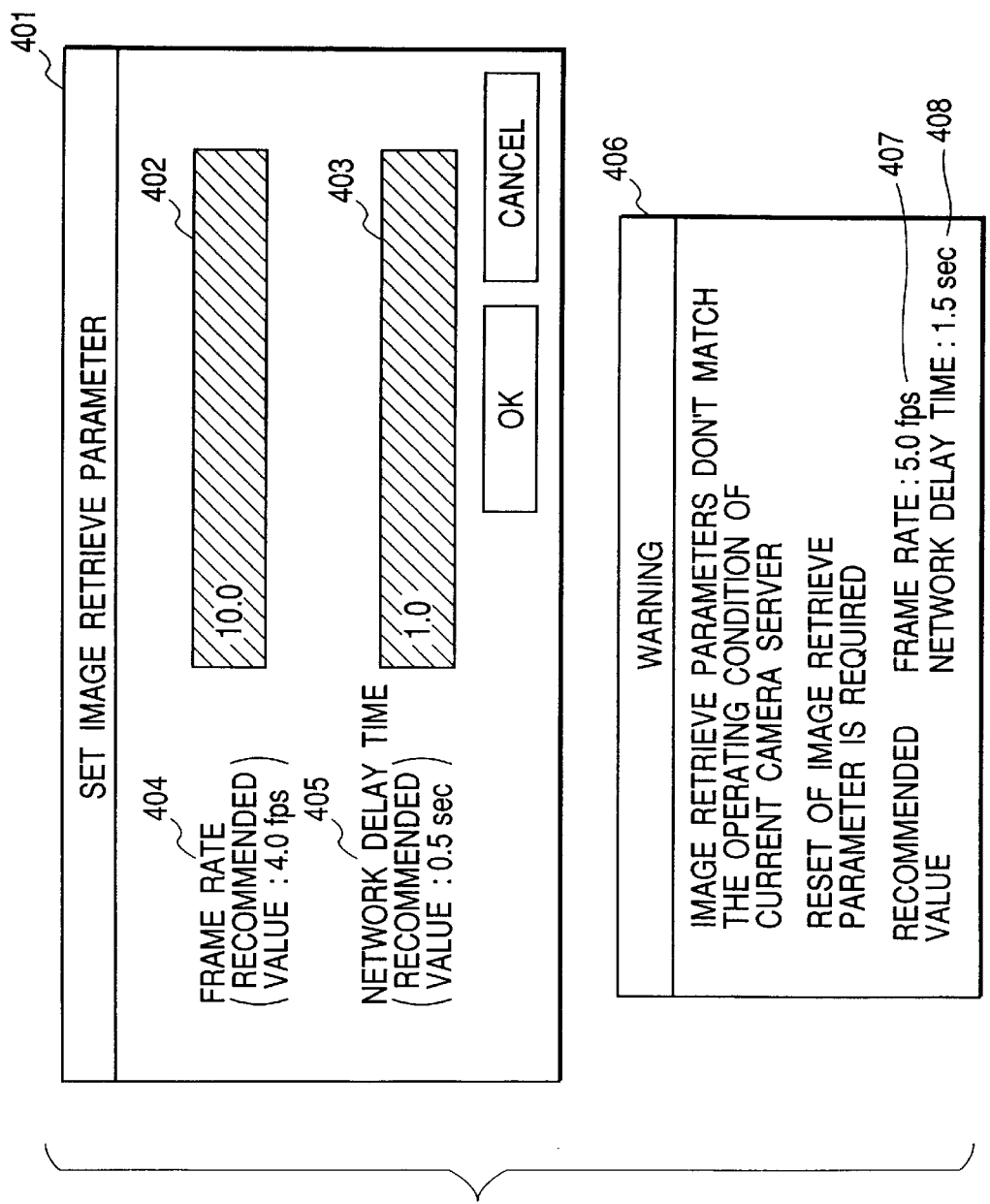

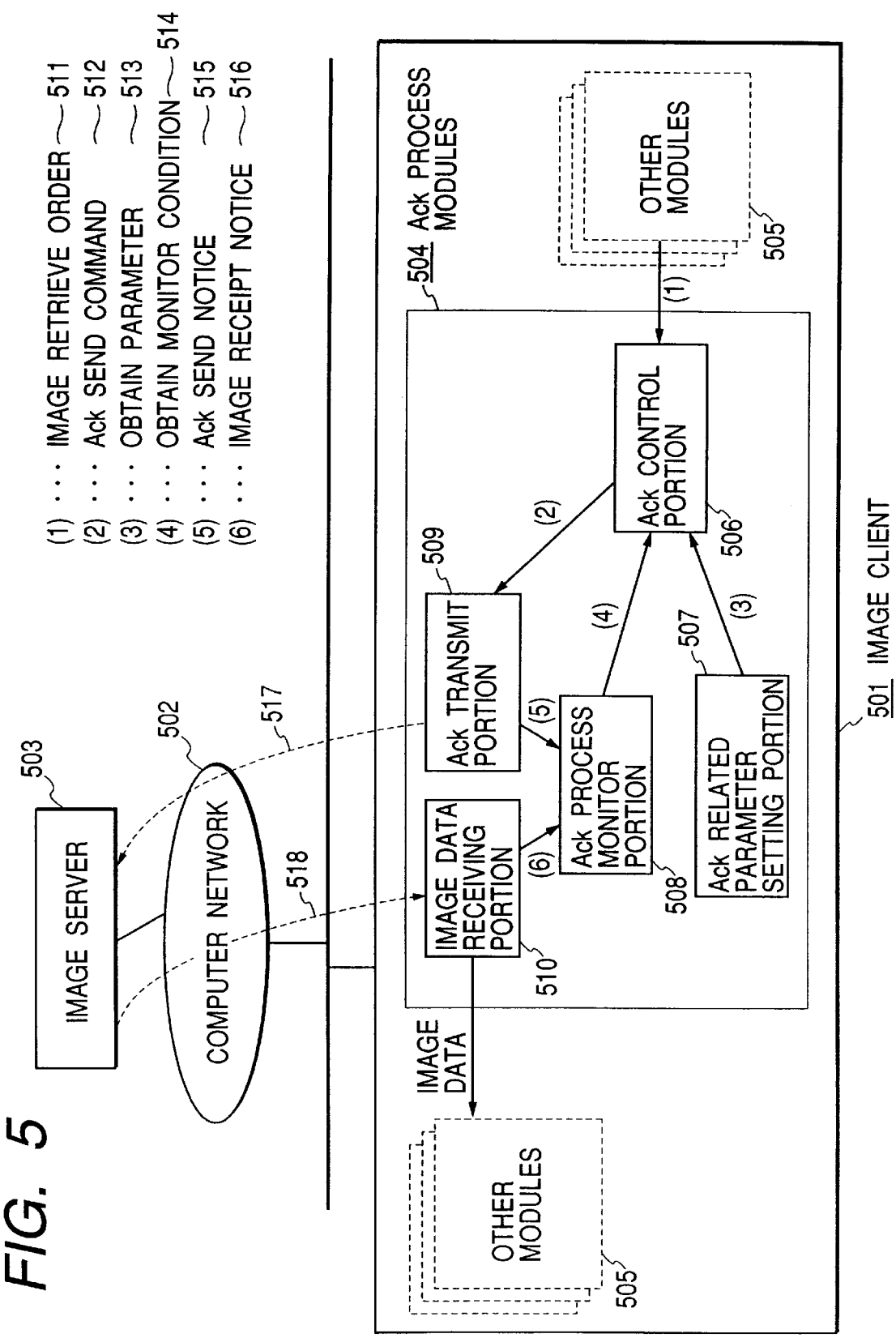

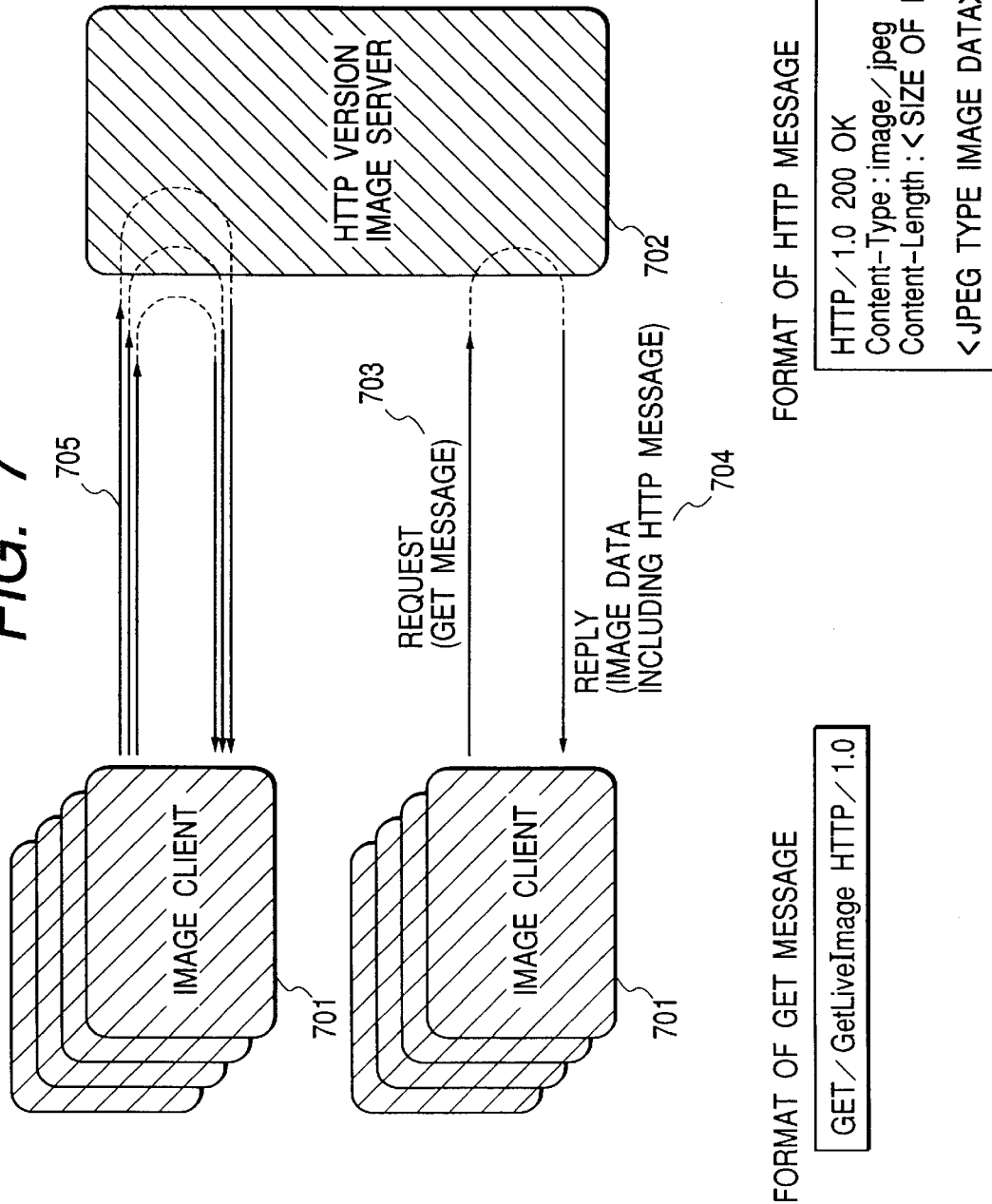

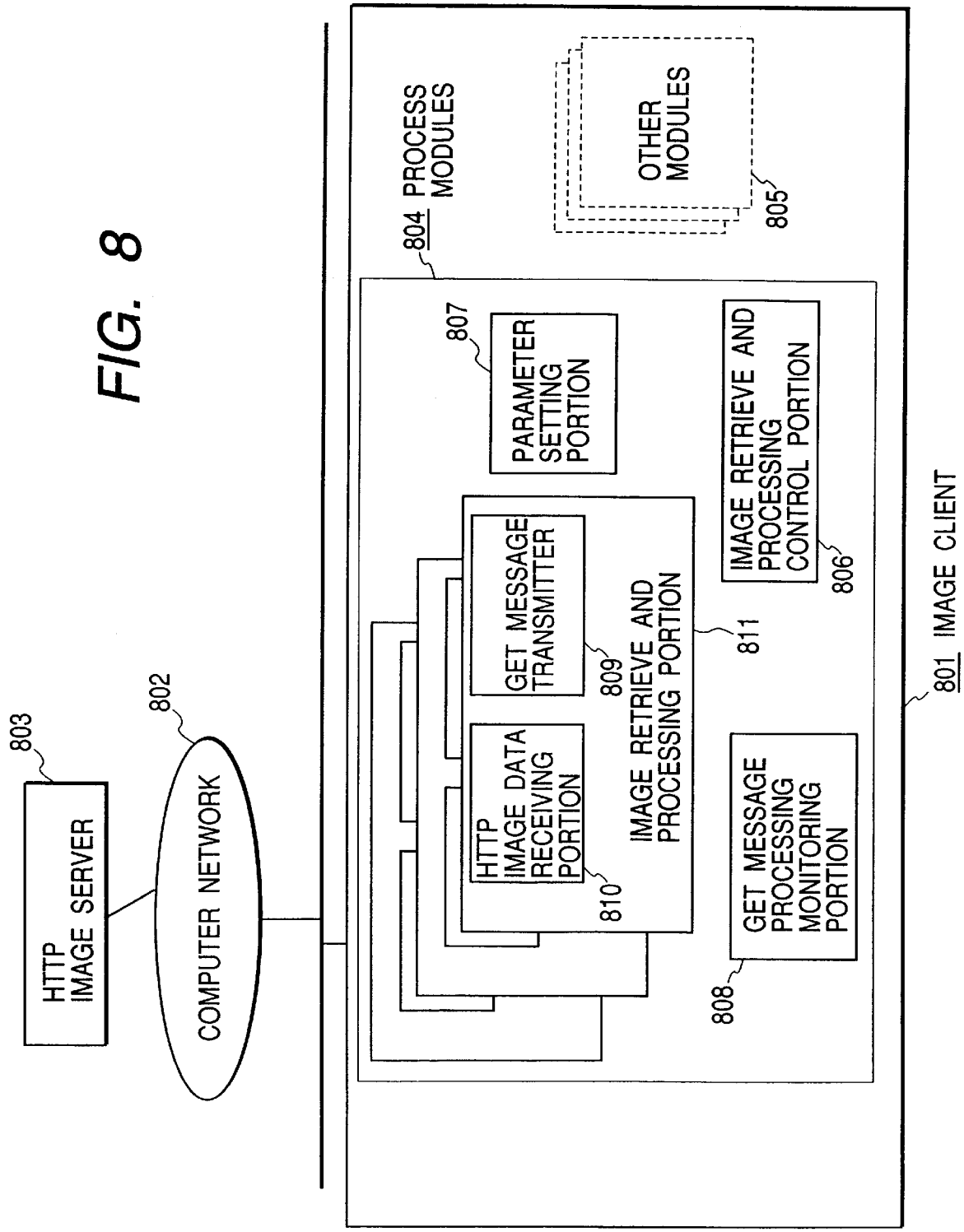

DISTRIBUTING SYSTEM, CLIENT, METHOD AND MEDIUM

BACKGROUND OF THE INVENTION

1. Field of the Invention

The present invention relates to a distributing system for distributing e.g., stream system data to a network, a client and its method.

2. Related Background Art

In recent years, as a computer network environment such as an internet, an intranet, etc. spreads and is highly improved in performance, an image distributing system has been developed and practically used. In this image distributing system, multimedia data of a stream system such as images and voices, etc. are distributed to plural clients as service through a computer network.

Conventionally, a system shown in FIG. 2 is proposed as an image data distributing system in such an image distributing system. In FIG. 2, an image client (201) is a program started to make a user view an image. The image client (201) connects this system to a suitable image server (202) in accordance with a user's request.

In this system, the image client (201) first transmits a request (image retrieve order, 203) to the image server (202). The image server (202) transmits image data (204) of one to several frames to the image client (201) as a reply to the request (203). The image client (201) displays the image data (204) in a display, etc. When display processing is terminated, the image client (201) again transmits the request (203) to the image server (202). Thus, images are distributed by repeating the request and the reply between the client and the server (hereinafter, this system is called "a request & reply system").

The request & reply system is characterized in that an image data amount and a frame rate are automatically adjusted in accordance with a display speed of the image client and a situation of the network.

When a CPU load of the image client is increased and the situation of the network becomes worse, it takes time to transmit the request. Thus, an arriving interval of the request at the image server is lengthened so that the amount of image data flowing to the network per time is reduced. As a result, loads of the network and the client are reduced. Conversely, when there are margins in the client and the network, an interval of the request is shortened so that the image data are sent at higher frame rate.

Further, no reply is made if there is no request. Accordingly, there is no fear that the image server sends the image data irrespective of a situation in which no image data can be received by troubles on sides of the image client and the network. A system (a continuous sending system) for continuously sending the image data to the client one-sidedly by the image server, etc. are proposed in systems except for the request & reply system. However, in the request & reply system, the frame rate and the data amount are simply controlled and it is not necessary for the network and the client to bear an excessive burden in comparison with the other systems such as the continuous sending system, etc. Accordingly, the request & reply system is suitable for utilization in an internet environment in which the network situation is greatly changed and plural services coexist.

However, a waiting time (hereinafter called this time "a network delay time") from the transmission of one request performed by the client to the arrival of a reply from the server becomes useless in the request & reply system. As shown in FIG. 3A, a request 2 is transmitted after the network delay time and a display time of a request 1 have passed. Accordingly, the frame rate becomes 1/T fps when (network delay time+display time)=T seconds.

It is considered as a dissolving method of this useless time that the request is sent to the image server in advance in anticipation of the network delay time as shown in FIG. 3B so as to apparently dissolve the useless time. (This system is called "a shift sending system".) In the shift sending system in FIG. 3B, requests are transmitted in advance such that the reply of the request 2 arrives just when the display of the request 1 is terminated. Thus, the frame rate can be improved such that this frame rate is 1/(display time) fps.

However, as shown in FIG. 3C in the actual network environment, the network delay time is violently changed by a line situation, a data amount, etc. As shown in FIG. 3C, the network delay time is changed in each of the requests 1, 2, 3, and there is a possibility that the reply arrives at the client in a reverse order in a certain case as in requests 2 and 3. Transmission timing of the next request must be determined by predicting a terminating time of the previous request so as to realize the shift sending system in such an environment. However, it is very difficult to predict a sudden change in the network delay time.

SUMMARY OF THE INVENTION

An object of the present invention is to provide a distributing system, a client, its method and medium capable of individually solving the above problems or solving all the above problems.

Another object of the present invention is to provide a distributing system, a client, its method and medium for improving distributing effects in comparison with a conventional case.

In view of such objects, one preferable mode of the present invention is characterized in a distributing system for distributing data from a server through a network, comprising:

request means for generating a request for obtaining data in the server;

predicted value obtaining means for obtaining a predicted value of a passing time from the generation of the request to data reception and a predicted value of a frame rate of the data;

means for obtaining the number of requests in which no data corresponding to the request are received from the server; and control means for controlling an operation of the request means based on the predicted values of a network delay time and the frame rate and the number of unprocessed requests.

Another object of the present invention is to provide a data distributing system, a client, its method and medium suitable for transfer of data called stream system data.

Still another object of the present invention is to provide a data distributing system, a client, its method and medium suitable for transfer of data through an internet.

The other objects and features of the present invention will become apparent from the following embodiments and explanation of the drawings.

BRIEF DESCRIPTION OF THE DRAWINGS

FIG. 2 is a conceptional view of a request & reply system in the image distributing system.

FIG. 4 is a view showing a user interface for setting parameters of the image distributing system.

FIG. 5 is a view for explaining an operating flow of the image distributing system.

FIG. 7 is a conceptional view of an HTTP version image distributing system in the first embodiment of the present invention.

FIG. 8 is a constructional view of the HTTP version image distributing system.

DESCRIPTION OF THE PREFERRED EMBODIMENTS

Figure 1:
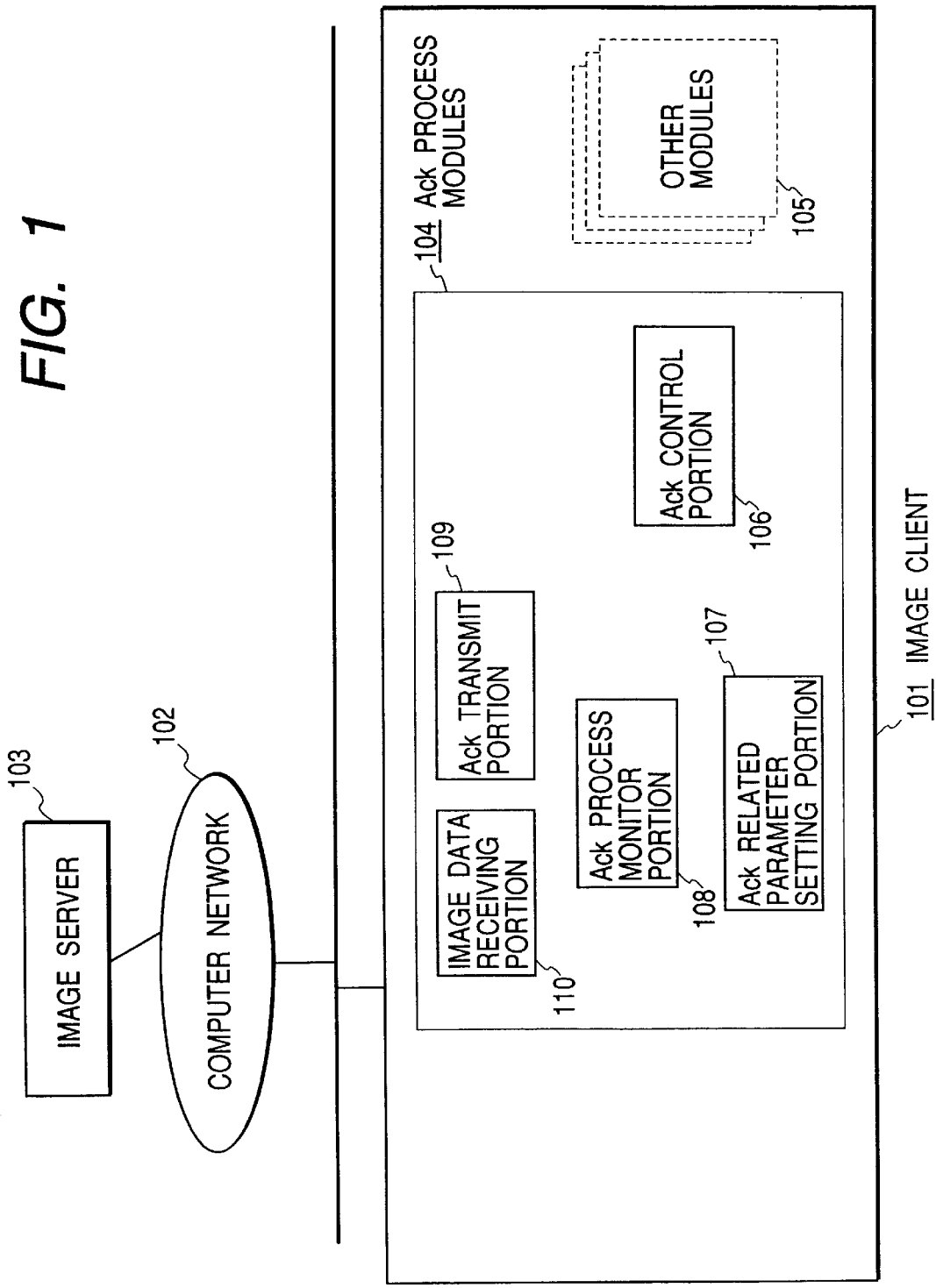
FIG. 1 is a constructional view of an image distributing system in a first embodiment of the present invention.
Figure 3A:
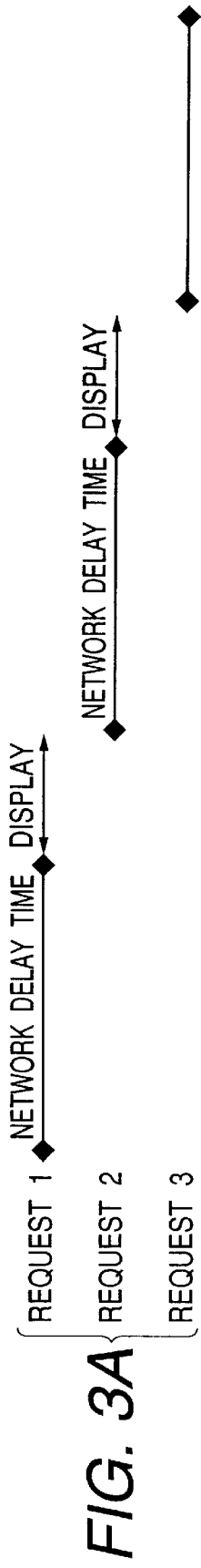
FIGS. 3A, 3B and 3C are views showing characteristics of the request & reply system.
Figure 3B:
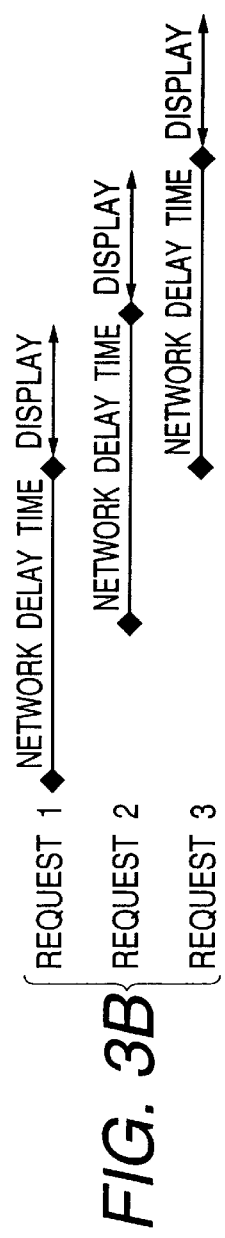
Figure 3C:
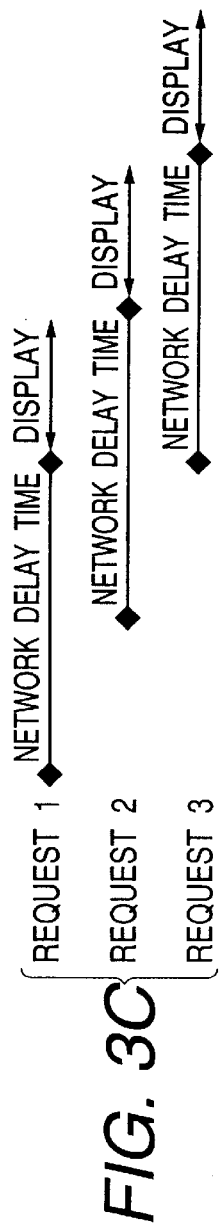

An image distributing system in one embodiment of the present invention will next be explained as a first embodiment. This image distributing system is constructed by an image server for transmitting a video image and an image client for enjoying the image by a user. Operations of each image server and the image client are prescribed by a program operated in a suitable computer. Image data can be transmitted to plural image clients by one image server. This image distributing system controls the image data by extending a request & reply system. In this embodiment, a request is called an acknowledge message (hereinafter briefly called an Ack or an Ack message). Contents of the Ack message are constructed by only a session ID for discriminating the connection between the image client and the image server. The session ID is represented as an integer equal to or greater than 0. The session ID is allocated by the server and is transmitted to the client when the connection between the image server and the image client is formed. A reply in this embodiment may be made with respect to each of an intra-picture and an interframe picture if data are image data of one frame compressed in a JPEG type, or image data compressed in the MPEG system as data showing one field, in short, one picture. When the image server receives the Ack message, JPEG image data are transmitted to the image client as a sending source. Contents of the reply can be applied to the present invention even when these contents are of a compression type of MPEG, etc. except for the JPEG type and are constructed by image data of plural frames instead of one frame. Further, it is also applicable when voice data and character data except for the image data are treated. In this case, it is sufficient to transmit data in size suitable for characteristics or a unit of the respective data.

In a control system of the image data in this image distributing system, no request is sent one by one prior to the reply as in a shift sending system, but a constant number of requests are first transmitted to the image server. Thereafter, similar to the request & reply system, the request is repeated every time the reply is received. This system is called an advance transmission system.

This system utilizes that processing is performed one by one every 1/F second even when a maximum value of a transmission frame rate of the server is set to Fs frame/second (fps) and plural requests are simultaneously transmitted. Accordingly, this system is the same as a system in which the requests are shifted and sent every 1/Fs second even when these requests are simultaneously transmitted.

In this embodiment, the number of requests (an advance transmission number of the requests) to be first transmitted is controlled in the following way. First, an average value of a network delay time is predicted and set to N seconds. In this case, the image server at the maximum frame rate Fs fps can transmit N×Fs replies to the image client during the network delay time N of one request. Accordingly, it is sufficient to transmit N×Fs requests in advance. In reality, since the frame rate Fs depends on an environment of the image server, a predicted value F is determined and N×F is used as "a predicted advance transmission number" of the requests.

In reality, there is a case in which the network delay time is changed by influences of a shift in the network delay time from the predicted value N and operating environments of the network and the client, etc. In this embodiment, the following control is performed to cope with the change in the network delay time. First, a value of (request number–reply number) is calculated by checking the number of requests transmitted from the image client until a certain time point (e.g., when a constant number of replies are received), and the number of replies received by the image client at that time point. This value is called "an unprocessed reply number". When the network delay time is in conformity with the predicted value N, one request is transmitted every is transmitted. Accordingly, "the unprocessed reply number" is approximately equal to "a predicted advance transmission number".

When the network situation becomes worse and performance of the distributing system such as a transmission speed, etc. is reduced, the number of unprocessed requests becomes greater than the predicted advance transmission number. Therefore, when > unprocessed request number>predicted advance transmission number *a (a is an integer equal to or greater than 1)
is formed, the distributing system is constructed such that no request is transmitted even when the image client receives the reply until excessive requests (=unprocessed request number–predicted advance transmission number) are processed by the image server. At this time point, the network delay time is calculated by the following formula.

> Measured network delay time=unprocessed request number/frame rate

When the following relation with respect to a predicted network delay time is formed, > measured network delay time>a*predicted network delay time the frame rate and the predicted delay time are corrected (the value of a is controlled in this embodiment such that this value is set to 2).

In contrast to this, when performance rises by improving the network situation, the unprocessed request number becomes smaller than the predicted advance transmission number.

> When unprocessed request number<predicted advance transmission number/b (b is an integer equal to or greater than 1)

is formed, insufficient requests (=predicted advance transmission number−unprocessed request number) are transmitted together to the image server. At this time point, if measured network delay time<predicted network delay time/b is formed, the frame rate and the predicted delay time are corrected (the value of b is controlled in this embodiment such that this value is set to 2).

Concretely, the frame rate is increased or the predicted delay time is shortened. Constructional elements of the distributing system in this embodiment will next be explained by using FIG. 1. In FIG. 1, reference numeral (101) designates an image client. The image client (101) is really a program set to a main memory of a computer such as PC, etc. and executed by a CPU. The image client (101) communicates with an image server (103) through a computer network (102).

An internal module (a unit of software for executing a predetermined function) of the image client (101) can be classified into Ack process modules (104) and other modules (105). The Ack process modules (104) provide a function for obtaining image data by sending an Ack message to the image server (103). The other modules (105) include a software module for performing a user interface, a moving image display, etc. and utilizes the Ack process modules (104) to obtain displayed image data.

The following software modules belong to the Ack process modules (104).

Ack Process Control Portion (106)

This Ack process control portion (106) is a module for controlling the transmission of an Ack message to the image server (103). Further, the Ack process control portion (106) provides an interface for making the other modules (105) utilize the function of the Ack process modules (104). An image retrieve order (image obtaining commands) is issued to this Ack process control section (106) to obtain an image by the other modules (105).

(In the following explanation, "commands" are set to be transmitted and received in the communication between modules and submodules. In a concrete realizing mode of the "commands", these commands can be realized by messages of object-oriented languages and procedures and calls of normal program languages, etc. These realizing methods are different from each other in accordance with various kinds of languages.)

Ack Process Related Parameter Setting Portion (107)

The Ack process related parameter setting portion (107) is a module for controlling predicted values of the frame rate and the network delay time required to control Ack transmission. The Ack process related parameter setting portion (107) has a function for displaying a panel (401) as shown in FIG. 4. Input fields (402, 403) for setting suitable predicted values of the frame rate and the network delay time by utilizing this panel are provided to a user. Recommended values (404, 405) at this time point are also displayed. (A calculating method of the recommended values will be described later.) The display of such a panel is realized by a hardware resource of the above-mentioned computer, concretely, a RAM called a display buffer, a display controller, a display and an OS.

Ack Process Situation Monitor Portion (108)

The Ack process situation monitor portion (108) is a module for monitoring the number of Ack messages transmitted to the image server and the number of image data obtained from the image server. The number of unprocessed Ack messages can be calculated if the number of image data is subtracted from the number of Ack messages. The Ack process situation monitor portion (108) is also used to calculate the frame rate actually measured from the number of received image data and a passing time.

Ack Transmitting Portion (109)

The Ack transmitting portion (109) is a module for transmitting an Ack message to the image server. The Ack transmitting portion (109) is realized by using a mechanism of interprocess communication such as a socket, etc.

Image Data Receiving Portion (110)

The image data receiving portion (110) is a module for receiving the image data sent from the image server. Similar to the Ack transmitting portion (109), the image data receiving portion (110) is realized by using a mechanism of the interprocess communication. The image data receiving portion (110) also provides an interface for making the other modules (105) utilize the function of the Ack process modules (104). Update image data can be obtained by calling the image data receiving portion (110).

Figure 6A:
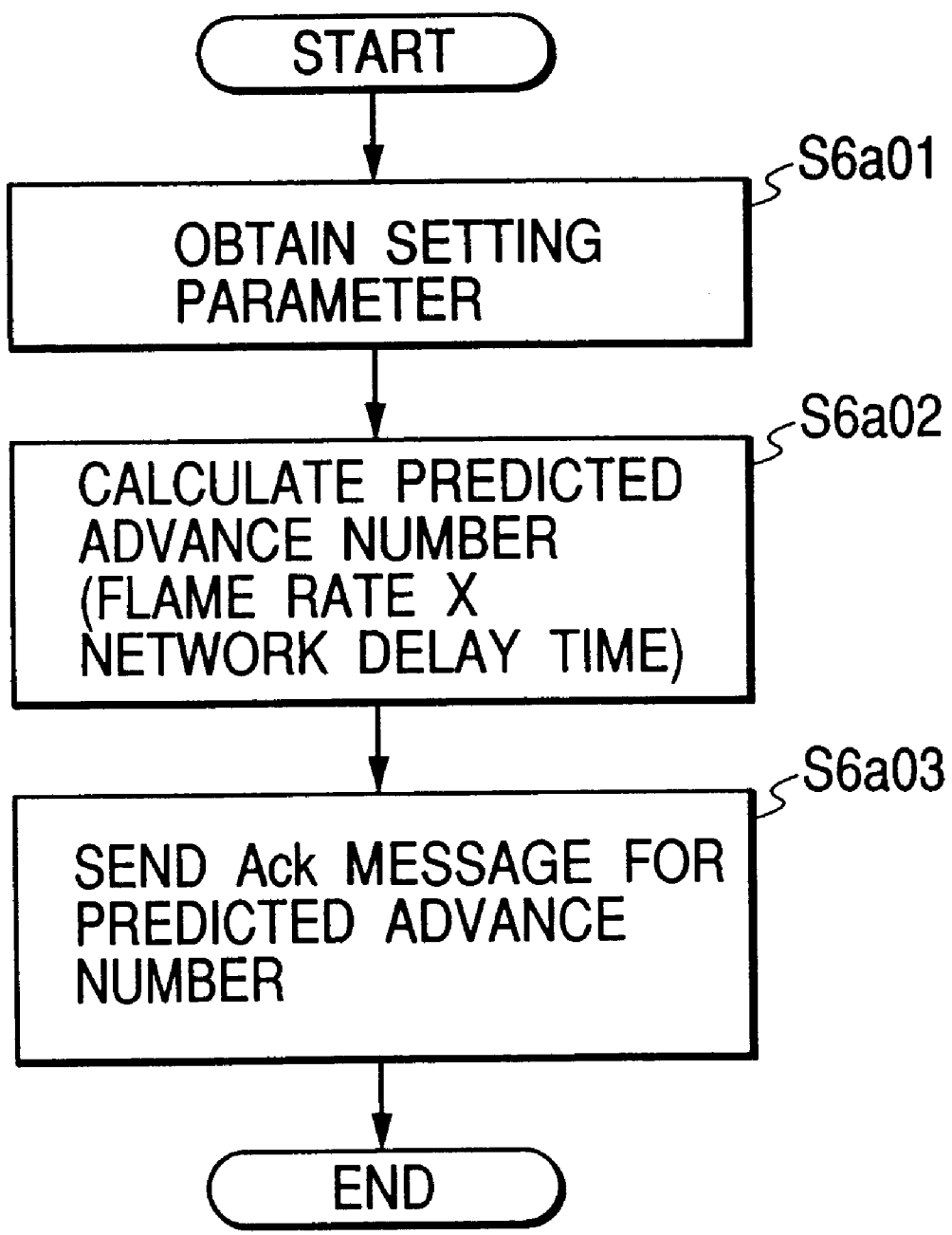
FIGS. 6A and 6B are flow charts of processing shown in FIG. 5.
Figure 6B:
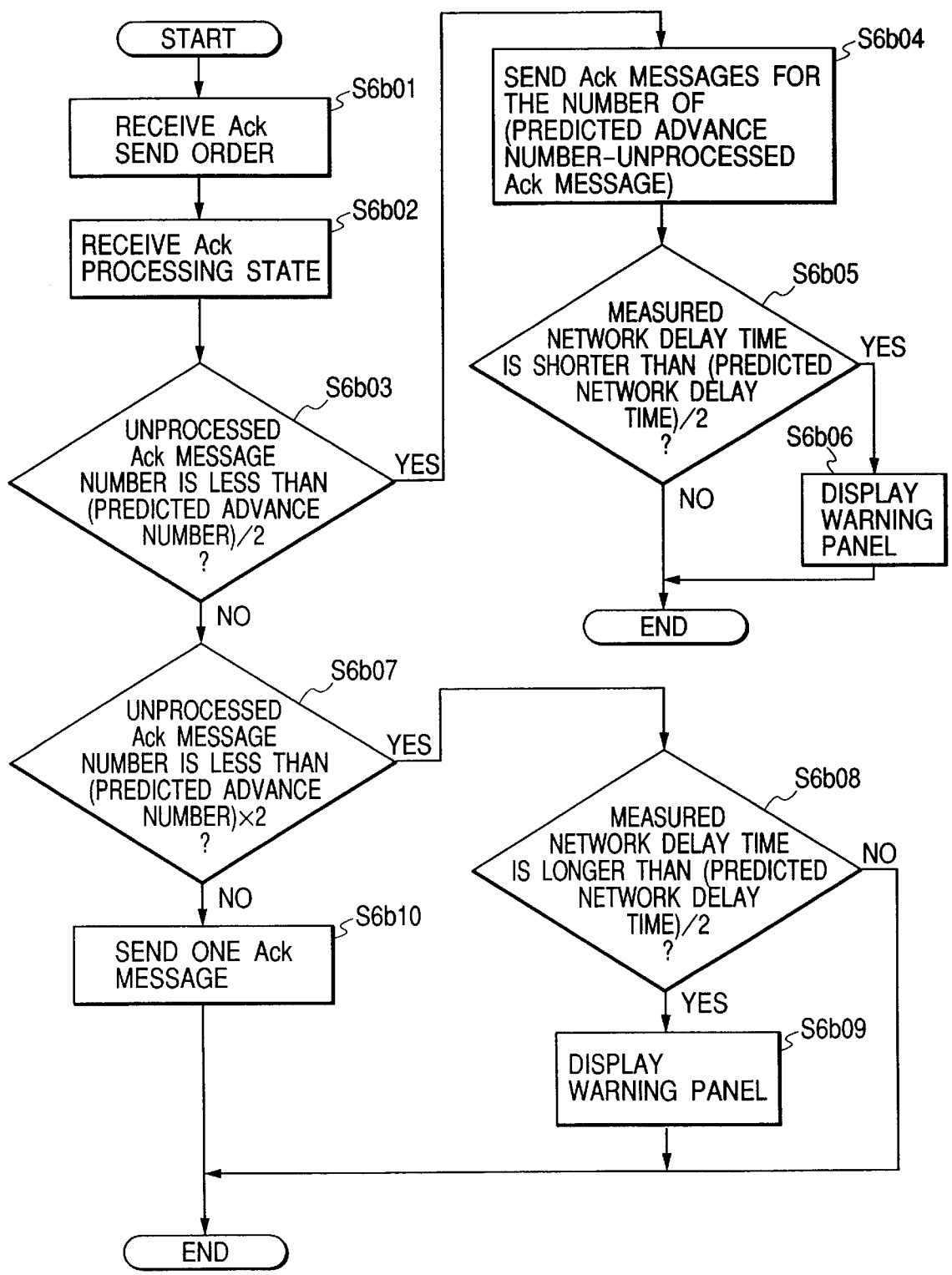

A processing flow in this embodiment will next be explained by using FIG. 5 and the flow charts of FIGS. 6A and 6B. When an image client (501) is started by a user and can communicate with an image server (503), an Ack process control module (506) calls an Ack process related parameter setting portion (508) and takes-out predicted values of a frame rate and a network delay time preset by a panel shown in FIG. 4 or preset as initial values of a device (S6a01). Such set values may be values of the frame rate and the network delay time set as default values, or values determined in accordance with kinds of the image server or kinds of a communication path reaching the image server. Next, the Ack process control module (506) calculates predicted advance transmission number=predicted frame rate×predicted network delay time from the values of taken-out parameters. The Ack process control module (506) transmits the predicted advance transmission number to an Ack transmitting portion (509) so that the image server (503) transmits Ack messages by the predicted advance transmission number (S6a03).

After the Ack messages are transmitted in advance as mentioned above, Ack transmitting control processing is performed by the following procedure. First, when the Ack process control portion (506) receives an image retrieve order (image obtaining commands) from the other modules (505) (S6b01), the Ack process control portion (506) takes the total number of Ack messages transmitted to the image server and the total number of image data obtained from the image server out of the Ack process situation monitor portion (508), and calculates the number of unprocessed Ack messages (S6b02).

Here, when the Ack transmitting portion (509) transmits Ack messages, the number of transmitted Ack messages is added to an Ack send notice (515) and is transmitted to the Ack process situation monitor portion (508). When an image data receiving portion (510) receives image data, the image data receiving portion (510) transmits an image receipt notice (516) to the Ack process situation monitor portion (508). The Ack process situation monitor portion (508) monitors the total number of Ack messages and the total number of obtained image data transmitted by the above notices (515, 516).

When the number of unprocessed Ack messages is equal to or smaller than the predicted advance transmission number/2 (S6b03), the Ack process control portion (506) transmits Ack messages by (predicted advance transmission number−unprocessed Ack message number) to the image server (503) by using the Ack transmitting portion (509) (S6b04).

Further, a measured network delay time is calculated in accordance with actually measured frame rate=received image data total number/ passing time from receiving start, and measured network delay time=unprocessed Ack message number/ actually measured frame rate.

If this value of the measured network delay time is equal to or smaller than half the predicted network delay time (S6b05), commands showing this value are given to the Ack process situation monitor portion (508) and this value is displayed on a warning panel (406) of FIG. 4 to suggest changes in the predicted values of the frame rate and the network delay time to a user (S6b06). At this time, the actually measured frame rate and the actually measured network delay time calculated in the above process are displayed as recommended values (407, 408) on the warning panel 406 shown in FIG. 4. No Ack message is transmitted when the unprocessed Ack message number is equal to or greater than the predicted advance transmission number×2 (S6b07). Instead of this, the actually measured frame rate and the measured network delay time are calculated. If the measured network delay time is equal to or greater than twice the predicted network delay time (S6b08), commands are given to the Ack process situation monitor portion (508) so as to display the warning panel (406) and suggest the changes in the frame rate and the network delay time to the user (S6b09).

Only one Ack message is transmitted when the unprocessed Ack message number is greater than the predicted advance transmission number/2 and is smaller than the predicted advance transmission number×2, i.e., when the delay of the network lies within a predetermined range (S6b10).

It is possible to cope with a change in the network situation and a moving image can be processed without uselessly wasting the network delay time by the above construction and processing. Further, in this embodiment, it is also possible to cope with a more complicated situation by setting parameters by the user. Conditional setting in each of steps S6a02, S6b03, S6b07, S6b04, S6b05, S6b08, etc. is described as one example, and can be variously changed in a range in which effects of the present invention are obtained. (Other embodiments)

Here, a second embodiment of the present invention will next be explained. In this embodiment, the present invention is applied to an HTTP moving image distributing system for distributing a moving image by using an HTTP protocol used in a World Wide Web system (hereinafter called Web) for transferring data through an internet.

FIG. 7 is a conceptional view for explaining an operation of the HTTP moving image distributing system in this embodiment. Similar to the general moving image distributing system shown in FIG. 2, one image server (702) and plural image clients exist. When an image client (701) transmits a request, the image server (702) transmits image data.

In this embodiment, the request is called "a GET message". The GET message is constructed by a series of characters of "GET/GetLiveImage HTTP/1.0" as shown by (705). A reply from the image server is constructed by image data of a JPEG type, etc. to which an HTTP showing a kind of the image data and a data size as shown by (706) is added.

In this embodiment, a communication protocol is realized on the basis of the HTTP protocol. Therefore, different from the Ack message in the embodiment 1, a connection with the image server is generated every one request (703) and reply (704). In other words, in the Ack message in the embodiment 1, one connection is first made and plural messages can be flowed into this connection. However, in this embodiment, each of requests requires a dedicated connection. Therefore, as shown by (705), plural connections must be generated between the image client (701) and the image server (702) to perform processing corresponding to advance transmission of the request.

FIG. 8 is a constructional view of this embodiment constructed in consideration of this respect. In FIG. 8, similar to FIG. 1, an image client (801) and an image server (803) are connected to each other by a computer network (802). The image client (801) is internally divided into an image retrieve processing module (804) and other modules (805). The image retrieve processing module (804) is constructed by an image retrieve and processing control portion (806), a parameter setting portion (807), an image retrieve and processing situation monitoring portion (808), a Get message transmitting portion (809) and an HTTP image data receiving portion (810). These portions respectively have almost the same functions as the Ack process control portion (106), the Ack process related parameter setting portion (107), the Ack process situation monitor portion (108), the Ack transmitting portion (109) and the image data receiving portion (110) in FIG. 1. Only the difference between this embodiment and the embodiment 1 will be described in the following explanation.

The parameter setting portion (807) has no user interface as shown by 401 or 406 in FIG. 4. Therefore, parameters are changed by a user in the embodiment 1, but are automatically changed by the image retrieve and processing control portion (806).

Plural connections must be generated between the image server (803) and the image client since the above HTTP message is restricted. Accordingly, it is necessary to arrange-plural GET message transmitting portions (809) and plural HTTP image data receiving portions (811). In this embodiment, the GET message transmitting portions (809) and the HTTP image data receiving portions (811) are treated together as an image retrieve and processing portion (811). In FIG. 8, three image retrieve and processing portions are shown, but an image retrieve and processing portion can be newly made and deleted in the image retrieve and processing control portion (806) in accordance with situations. The number of image retrieve and processing portions is equal to the advance transmission number of Ack messages in the embodiment 1. This number is called "an image retrieve connection number" in this embodiment.

In this embodiment, an image is not obtained after commands are given to the other modules (905), but is obtained by independently transmitting a Get message by an image retrieve and processing portion (911) on the basis of information from an image retrieve and processing control portion (906) as described later. Data of the obtained image are held in a buffer within the image retrieve and processing portion (911). When the other modules (905) require the image data from the image retrieve and processing portion (911), update data within this buffer are transmitted to the other modules (905).

Figure 9:
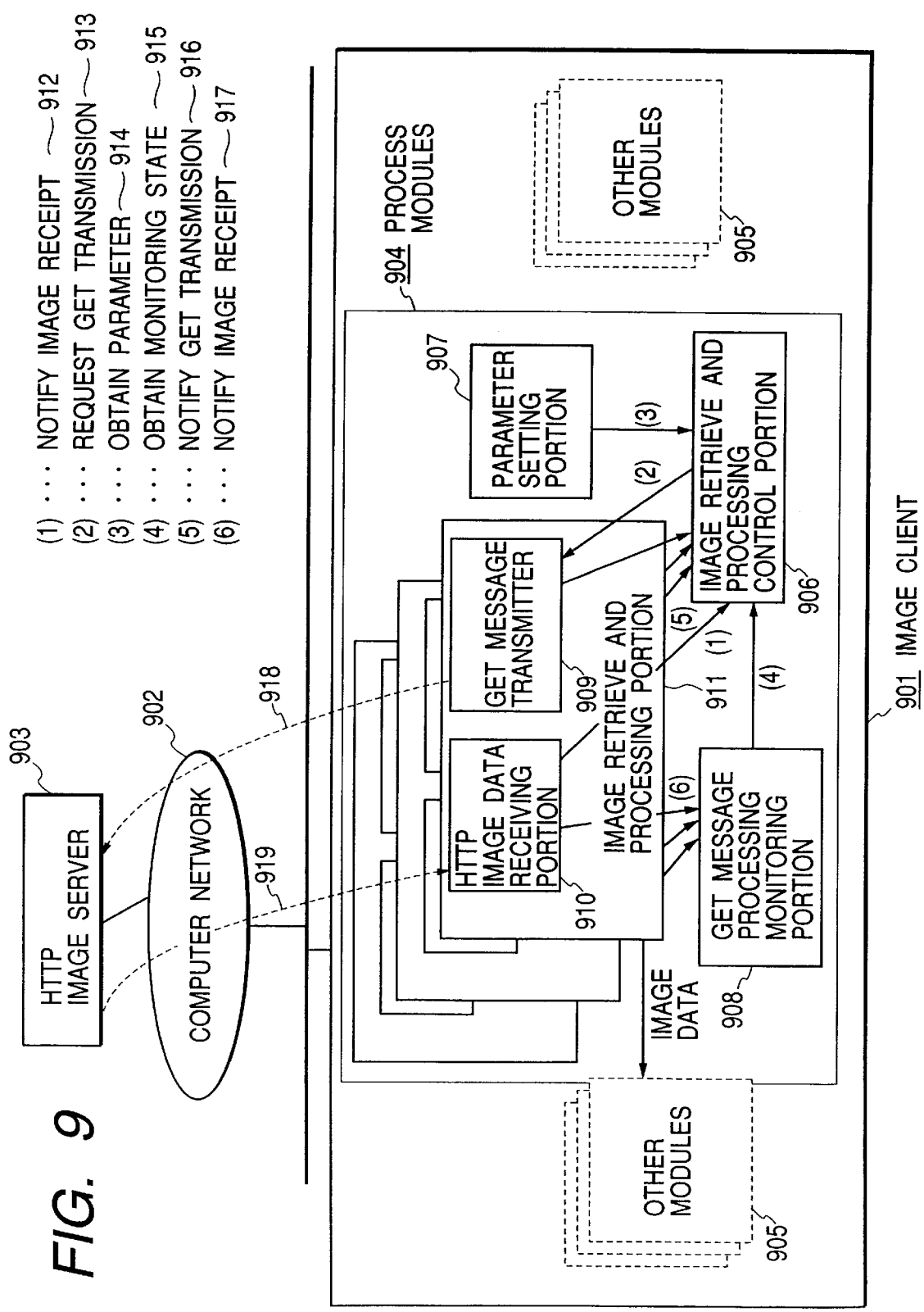
FIG. 9 is a view for explaining an operating flow of the HTTP version image distributing system.
Figure 10A:
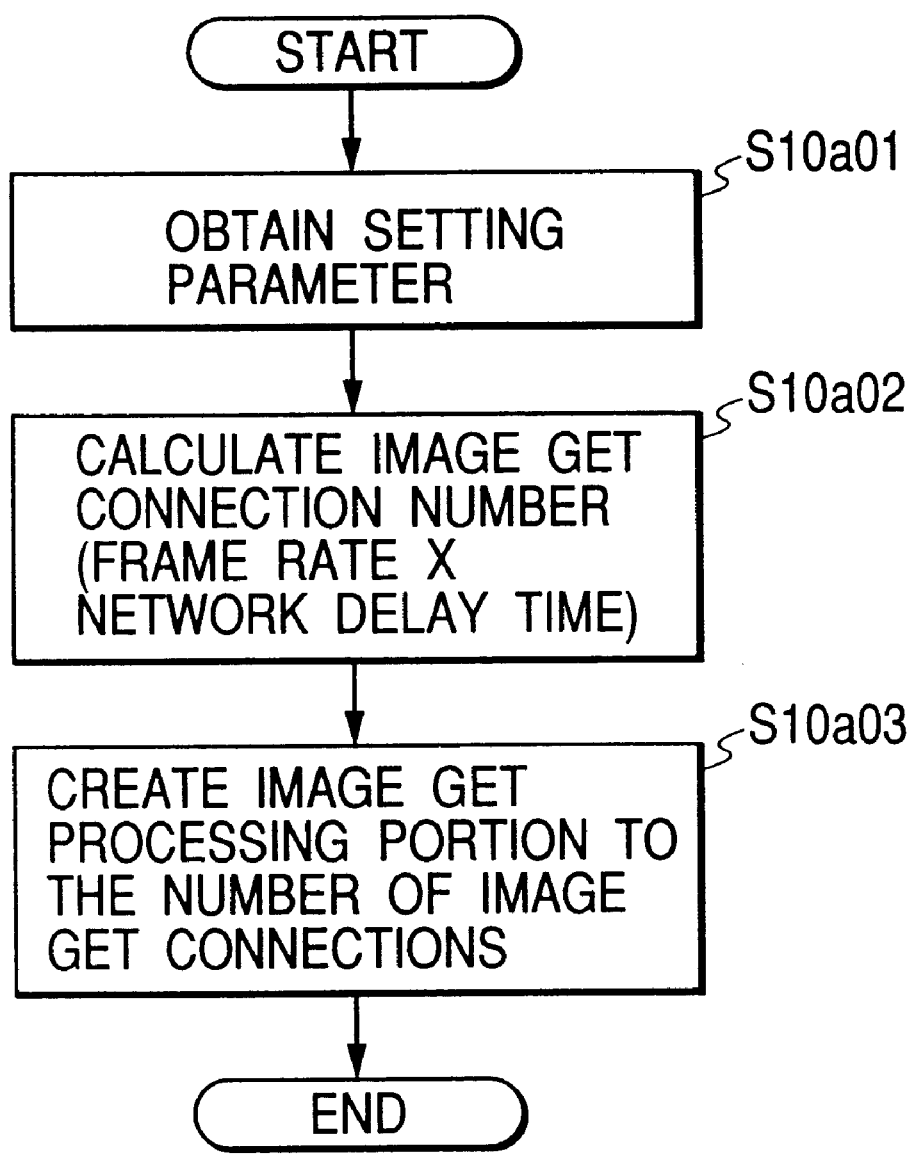
FIGS. 10A and 10B are flow charts of processing shown in FIG. 9.
Figure 10B:
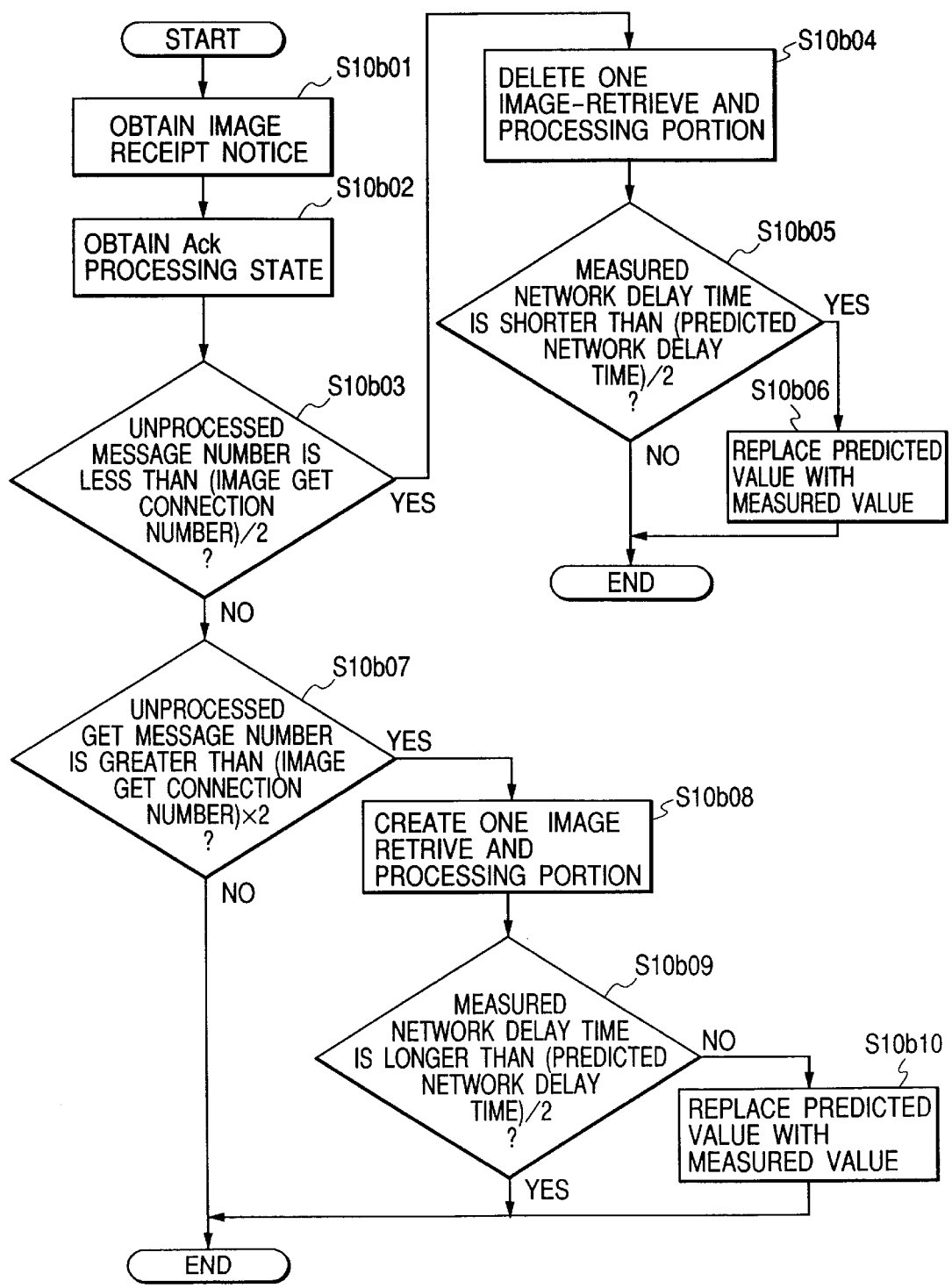

An operation of the distributing system in this embodiment will next be explained by using FIG. 9 and the flow charts of FIGS. 10A and 10B. First, when an image client (901) is started by a user and can communicate with an image server (903), the image retrieve and processing control portion (906) calls a parameter setting portion (907) and takes the preset values of a frame rate and a network delay time out of the parameter setting portion (907) (S10a01).

The number of image retrieve connections is then calculated from the taken-out values of the parameters on the basis of the following formula (S10a02).

Image retrieve connection number=predicted frame rate× predicted network delay time Then, image retrieve and processing portions (911) are made by the calculated image retrieve connection number (S10a03). Each of the made image retrieve and processing portions (911) transmits a Get message (918) shown in FIG. 9 to the image server (903).

Next, image retrieve processing at a normal time is performed as follows. As mentioned above, each image retrieve and processing portion (911) independently repeats the transmission of the Get message (918) and the reception of image data (919). When the image retrieve and processing portion (911) receives the image data, the image retrieve and processing portion (911) transmits an image receipt notice (917) to the image retrieve and processing control portion (906). When the image retrieve and processing control portion (906) receives the image receipt notice (917) (S10b01), the image retrieve and processing control portion (906) takes-out the total number of Get messages transmitted from an image retrieve and processing situation monitoring portion (908) to the image server and the total number of image data obtained from the image server, and calculates the number of unprocessed Get messages (=the total number of Get messages−the total number of image data) (S10b02). When the unprocessed Get message number is smaller than the image retrieve connection number/2 (S10b03), the image retrieve and processing control portion (906) newly generates one image retrieve and processing portion (911).

Further, a measured network delay time is calculated by the following formulas actually measured frame rate=received image data total number/ passing time from receiving start, and measured network delay time=unprocessed Get message number/ actually measured frame rate.

If this calculated value of the measured network delay time is equal to or smaller than half a predicted network delay time (S10b05), commands are given to the parameter setting portion (807) such that the predicted frame rate and the predicted network delay time are replaced with the actually measured frame rate and the measured network delay time (S10b06).

Further, if the unprocessed Get message number is greater than the image retrieve connection number ũû2 (S10b07), one image retrieve and processing portion (911) is deleted (S10b08). Then, the measured network delay time is calculated. If the calculated value of the measured network delay time is equal to or greater than twice the predicted network delay time (S10b09), commands are given to the parameter setting portion (807) such that the predicted frame rate and the predicted network delay time are replaced with the actually measured frame rate and the measured network delay time (S10b10).

When the unprocessed Get message number is equal to or greater than the image retrieve connection number/2 and is equal to or smaller than the image retrieve connection number×2, processings of the operated Get message transmitting portion and the operated HTTP image data receiving portion are continued. In this embodiment, similar to the above case, conditions in steps S10a02, S10b03, S10b07, S10b05 and S10b09 can be variously changed in a range in which the effects of the present invention are obtained.

A moving image can be also distributed by the above construction and processing in the image distributing system using HTTP almost irrespective of a change in the network situation without uselessly wasting the network delay time.

As mentioned above, a moving image distributing system in this embodiment has transmitting means of a request, means for obtaining predicted values of a network delay time and a frame rate, means for obtaining the number of requests unprocessed by a server, and request transmitting control means for controlling transmission of the request on the basis of the predicted values of the above network delay time and the above frame rate and the unprocessed request number.

Accordingly, this embodiment realizes a moving image distributing system capable of coping with an unexpected change in the network delay time and dissolving waste of the network delay time.

The present invention may be applied to a system constructed by plural devices or an apparatus constructed by one device.

The present invention may be also particularly embodied with respect to only a client. For example, when no functional extension on a server side is required, a medium controlled on a client side and having a method for this control corresponds to a system in which the present invention is embodied.

A camera server device and a client device explained in this embodiment can be realized by a personal computer and a work station even when there is a difference in hardware more or less. Accordingly, the present invention can be also achieved by supplying a memory medium recording a program code of software for realizing a function in the embodiment to the system or device, and reading and executing a program code for storing a computer (or a CPU and an MPU) of this system or device to the memory medium.

In this case, the program code itself read from the memory medium realizes the function in the above embodiment, and the memory medium storing this program code thereto constitutes the present invention.

For example, the memory medium for supplying the program code can be constructed by using a floppy disk, a hard disk, an optical disk, a magnetooptic disk, a CD-ROM, a CD-R, a magnetic tape, a non-volatile memory card, a ROM, etc.

The function in the above embodiment is realized by executing the program code read by the computer. Further, the function in the above embodiment is also realized by performing one portion or all portions of the actual processing by an OS (operating system), etc. operated in a computer on the basis of commands of this program code.

Further, after the program code read from the memory medium is written to a memory arranged in a functional extension board inserted into a computer and a functional extension unit connected to the computer, the function in the above embodiment is also realized by performing one portion or all portions of the actual processing by a CPU arranged in the functional extension board and the functional extension unit, etc. on the basis of commands of this program code.

In this embodiment, the explanation is made by using image moving data, but the present invention can be similarly embodied if data are constructed by data of a stream system such as audio data, etc. In this embodiment, an example using the internet as a network is explained, but the effects of the present invention are large if the network is a network of a quality non-guarantee type. Further, the present invention can be applied without limiting a kind of the network.

As explained above, in accordance with this embodiment, distributing efficiency can be improved in comparison with a conventional case.

What is claimed is:

1. A distributing system for distributing data from a server through a network, comprising:

request means for generating a request for obtaining data in said server;

predicted value obtaining means for obtaining a predicted value of a passing time from the generation of said request to data reception and a predicted value of a frame rate of said data;

means for obtaining the number of requests in which no data corresponding to the request are received from said server; and control means for controlling an operation of said request means based on the predicted values of the frame rate and a delay time according to said passing time and information according to the number of requests in which no data are received, wherein said predicted value obtaining means has a user interface for setting information according to said delay time and said frame rate by a user.

2. The distributing system according to claim 1, wherein said number obtaining means monitors the number of transmitted requests and the number of said received data.

3. The distributing system according to claim 1, wherein said predicted value obtaining means of the delay time and the frame rate uses actually measured values of the delay time and the frame rate.

4. The distributing system according to claim 1, wherein said control means increases and decreases said unprocessed request number in accordance with situations.

5. The distributing system according to claim 1, wherein said control means first transmits plural requests in advance.

6. The distributing system according to claim 1, wherein said control means increases and decreases the number of requests generated by the request means.

7. The distributing system according to claim 1, wherein said data are data of a stream system.

8. The distributing system according to claim 7, wherein said data of the stream system are voice data.

9. The distributing system according to claim 1, wherein said network is a network of a quality non-guarantee type.

10. The distributing system according to claim 9, wherein said network is an internet.

11. A distributing method for distributing data from a server through a network, comprising:

generating a request for obtaining data in said server;

obtaining a predicted value of a passing time from the generation of said request to data reception and a predicted value of a frame rate of said data;

obtaining the number of requests in which no data corresponding to the request are received from said server; and controlling the occurrence of said request based on the predicted values of the frame rate and a delay time according to said passing time and the number of requests in which no data are received, wherein information according to the delay time and the frame rate is set by a user from the predicted values of said delay time and said frame rate.

12. The distributing method according to claim 11, wherein said request number is obtained on the basis of the number of transmitted requests and the number of said received data.

13. The distributing method according to claim 11, wherein actually measured values of the delay time and the frame rate are used when the predicted values of said delay time and said frame rate are obtained.

14. The distributing method according to claim 11, wherein said unprocessed request number is increased and decreased in accordance with situations in said control.

15. The distributing method according to claim 11, wherein plural requests are first transmitted in advance in said control.

16. The distributing method according to claim 11, wherein the number of requests generated by request means is increased and decreased in said control.

17. A medium having the distributing method described in claim 11 such that this method can be executed by a computer.

18. The distributing method according to claim 11, wherein said data are data of a stream system.

19. The distributing method according to claim 18, wherein said data of the stream system are voice data.

20. The distributing method according to claim 11, wherein said network is a network of a quality non-guarantee type.

21. The distributing method according to claim 20, wherein said network is an internet.

22. A client for receiving data from a server through a network, comprising:

request means for generating a request for obtaining data in said server;

predicted value obtaining means for obtaining a predicted value of a passing time from the generation of said request to data reception and a predicted value of a frame rate of said data;

means for obtaining the number of requests in which no data corresponding to the request are received from said server; and control means for controlling an operation of said request means based on the predicted values of the frame rate and a delay time according to said passing time and said number of requests in which no data are received, wherein said predicted value obtaining means has a user interface for setting said delay time and said frame rate by a user.

23. The client according to claim 22, wherein said number obtaining means monitors the number of transmitted requests and the number of said received data.

24. The client according to claim 22, wherein said predicted value obtaining means of the delay time and the frame rate uses actually measured values of said delay time and said frame rate.

25. The client according to claim 22, wherein said control means increases and decreases said unprocessed request number in accordance with situations.

26. The client according to claim 22, wherein said control means first transmits plural requests in advance.

27. The client according to claim 22, wherein said control means increases and decreases the number of requests generated by the request means.

28. The client according to claim 22, wherein said data are data of a stream system.

29. The client according to claim 28, wherein said data of the stream system are voice data.

30. The client according to claim 22, wherein said network is a network of a quality non-guarantee type.

31. The client according to claim 30, wherein said network is an internet.

32. A client control method for receiving data from a server through a network, comprising:

generating a request for obtaining data in said server;

obtaining a predicted value of a passing time from the generation of said request to data reception and a predicted value of a frame rate of said data;

obtaining the number of requests in which no data corresponding to the request are received from said server; and controlling the occurrence of said request based on the predicted vales of the frame rate and a delay time according to said passing time and the number of unprocessed requests, wherein the delay time and the frame rate are set by a user from the predicted values of said delay time and said frame rate.

33. The client control method according to claim 32, wherein said request number is obtained on the basis of the number of transmitted requests and the number of said received data.

34. The client control method according to claim 32, wherein actually measured values of the delay time and the frame rate are used when the predicted values of said delay time and said frame rate are obtained.

35. The client control method according to claim 32, wherein said unprocessed request number is increased and decreased in accordance with situations in said control.

36. The client control method according to claim 32, wherein plural requests are first transmitted in advance in said control.

37. The client control method according to claim 32, wherein the number of requests generated by request means is increased and decreased in said control.

38. A medium having the client control method described in claim 32 such that this method can be executed by a computer.

39. The client control method according to claim 32, wherein said data are data of a stream system.

40. The client control method according to claim 39, wherein said data of the stream system are voice data.

41. The client control method according to claim 32, wherein said network is a network of a quality non-guarantee type.

42. The client control method according to claim 41, wherein said network is an internet.

* * * * *